(12) United States Patent
Letondor et al.

(10) Patent No.: US 10,590,301 B2
(45) Date of Patent: Mar. 17, 2020

(54) SUBSTRATE COMPRISING A SURFACE COATED WITH AN EPILAMIZATION AGENT AND METHOD FOR EPILAMIZATION OF SUCH A SUBSTRATE

(71) Applicant: The Swatch Group Research and Development Ltd, Marin (CH)

(72) Inventors: Christophe Letondor, Le Landeron (CH); Claire Rannoux, Lausanne (CH)

(73) Assignee: The Swatch Group Research and Development Ltd, Marin (CH)

( * ) Notice: Subject to any disclaimer, the term of this patent is extended or adjusted under 35 U.S.C. 154(b) by 422 days.

(21) Appl. No.: 15/072,597

(22) Filed: Mar. 17, 2016

(65) Prior Publication Data

US 2016/0272842 A1   Sep. 22, 2016

(30) Foreign Application Priority Data

Mar. 18, 2015   (EP) ..................................... 15159581

(51) Int. Cl.
| | |
|---|---|
| C09D 127/12 | (2006.01) |
| C09D 133/16 | (2006.01) |
| C09D 143/02 | (2006.01) |
| C09D 143/04 | (2006.01) |
| C10M 107/38 | (2006.01) |
| C09D 133/14 | (2006.01) |
| C08F 220/24 | (2006.01) |

(52) U.S. Cl.
CPC .......... C09D 133/16 (2013.01); C08F 220/24 (2013.01); C09D 127/12 (2013.01); C09D 133/14 (2013.01); C09D 143/02 (2013.01); C09D 143/04 (2013.01); C10M 107/38 (2013.01)

(58) Field of Classification Search
CPC .. C09D 133/16; C09D 143/04; C09D 230/08; C09D 230/085; C09D 127/12; C10M 107/38
See application file for complete search history.

(56) References Cited

U.S. PATENT DOCUMENTS

| | | | |
|---|---|---|---|
| 4,147,851 A | 4/1979 | Raynolds | |
| 2005/0266758 A1* | 12/2005 | Nishikori | ............... D21H 13/40 442/327 |
| 2011/0077349 A1* | 3/2011 | Hoshino | ............... C08F 220/18 524/544 |
| 2013/0216837 A1 | 8/2013 | Iyer et al. | |
| 2015/0197661 A1 | 7/2015 | Richard et al. | |

FOREIGN PATENT DOCUMENTS

| | | |
|---|---|---|
| EP | 2 684 942 A1 | 1/2014 |
| WO | WO 2012/061021 A1 | 5/2012 |

OTHER PUBLICATIONS

European Search Report dated Sep. 25, 2015 in EP 15159581, filed Mar. 18, 2015 (with English Translation and Written Opinion).

* cited by examiner

*Primary Examiner* — Ramsey Zacharia
(74) *Attorney, Agent, or Firm* — Oblon, McClelland, Maier & Neustadt, L.L.P.

(57) ABSTRACT

A substrate including a surface, at least one part of which is coated with an epilamization agent including at least one compound in the form of a statistical copolymer comprising M units, N units and optionally at least one P unit, linked by covalent bonds by their main chains and randomly distributed, where M is

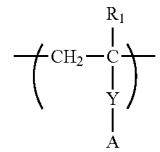

N is

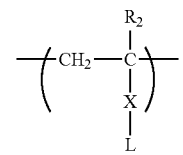

P is

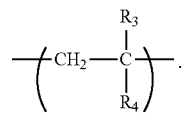

14 Claims, No Drawings

SUBSTRATE COMPRISING A SURFACE COATED WITH AN EPILAMIZATION AGENT AND METHOD FOR EPILAMIZATION OF SUCH A SUBSTRATE

This application claims priority from European Patent Application No. 15159581.6 filed Mar. 18, 2015, the entire disclosure of which is hereby incorporated herein by reference.

FIELD OF THE INVENTION

The present invention relates to the field of mechanics and in particular to the field of horology or jewellery. It more particularly concerns a substrate, particularly a substrate for an element of a timepiece or piece of jewellery comprising a surface at least partially coated with an epilamization agent. It also concerns a method for epilamizing such a substrate, and a timepiece or piece of jewellery comprising an element comprising such a substrate.

BACKGROUND OF THE INVENTION

There are various methods for modifying the surface state of a substrate through a treatment using an appropriate agent to specifically improve certain surface properties. For example, in the field of mechanics, and in particular in the field of horology, but also in the field of jewellery, a surface of a piece or an element is often epilamized with an epilamization agent to control and reduce the surface energy of said surface during use. More specifically, the purpose of an epilamization agent is to prevent the spreading of oils or lubricants on the elements of a timepiece or piece of jewellery by forming a hydrophobic and lipophobic surface allowing the lubricant to remain in a predetermined place on the treated surface.

However, the substances currently used for epilamization have various drawbacks. More specifically, known epilamization agents, such as Moebius® Fixodrop® FK/BS or the 3M™ Fluorad™ range, have poor resistance to watchmakers' cleaning operations. US Patent Application No 2012/0088099 partially solves this problem by proposing to use an epilamization agent having a catechol chain-end function, this catechol function being capable of secure attachment to the surface of substrates. However, the resistance of these epilamization agents to watchmakers' cleaning operations has not improved on all substrates, particularly gold and steel, which are very common substrates in the fields of horology and jewellery. Thus, the use of known epilamization agents is generally limited to certain materials, which requires the user to have various types of epilamization agents available depending on the nature of the surfaces to be treated. One solution for overcoming this problem is disclosed, for example, in WO Patent Application 2012/085130. This solution consists in using for the epilamization composition a mixture of different types of compounds (thiol and biphosphonic) whose synergistic effect enhances the adhesion of the epilame to the substrate. However, the synthesis of each of these compounds requires at least four steps, so that the method of synthesising the entire epilamization composition is long and complex.

SUMMARY OF THE INVENTION

It is an object of the invention to overcome the various drawbacks of known epilamization agents.

More specifically, it is an object of the invention to provide an epilamization agent offering increased resistance to cleaning compared to known epilamization agents.

It is also an object of the invention to provide a universal epilamization agent capable of being used for any type of material.

It is also an object of the invention to provide an epilamization agent that is simple to manufacture in a few steps, or even in a single synthesis step.

To this end, the present invention concerns a substrate comprising a surface at least part of which is coated with an epilamization agent.

According to the invention, said epilamization agent comprises at least one compound in the form of a random or statistical copolymer comprising M units, N units and optionally at least one P unit, linked by covalent bonds by their main chains and randomly distributed, where M is

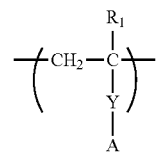

N is

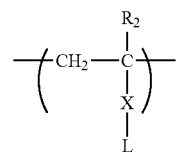

P is

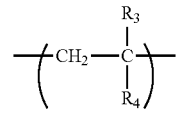

where $R_1$, $R_2$, $R_3$, which may be identical or different, are H, a $C_1$-$C_{10}$ alkyl group, a $C_1$-$C_{10}$ alkenyl group, and preferably H, a $CH_3$ group, Y, X, which may be identical or different, are spacer arms formed of a heteroatom or of a linear or branched hydrocarbon chain comprising at least one carbon atom, and that may contain at least one heteroatom, A, which may be identical or different, forms an anchoring moiety to the substrate, and is chosen from the group comprising thiols, thioethers, thioesters, sulphides, thioamides, silanols, alkoxysilanes, silane halides, hydroxyls, phosphates, protected or non-protected phosphonic acids, protected or non-protected phosphonates, amines, ammoniums, nitrogenated heterocycles, carboxylic acids, anhydrides, catechol, L, which may be identical or different, is a halogenated, preferably fluorinated, $C_1$-$C_{20}$ carbon moiety, $R_4$, which may be identical or different, is H, $CH_3$, a linear or branched, saturated or unsaturated hydrocarbon chain comprising at least 2 carbon atoms, and that may contain at least one heteroatom.

Such an epilamization agent offers improved resistance to cleaning and has a universal character, enabling it to be used for any type of material.

The invention also concerns a method for epilamization of at least one part of a substrate surface comprising the steps of:

a) preparing an epilamization agent comprising at least one statistical copolymer as defined above
b) optionally, preparing the substrate surface
c) placing the substrate surface in contact with the epilamization agent
d) drying.

The present invention also concerns a statistical copolymer comprising M units, N units and optionally at least one P unit, linked by covalent bonds by their main chains and randomly distributed, where M is

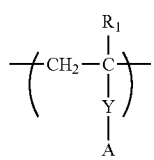

N is

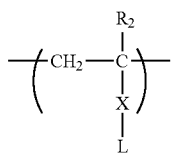

P is

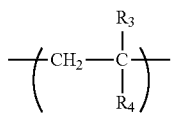

where $R_1$, $R_2$, $R_3$, which may be identical or different, are H, a $C_1$-$C_{10}$ alkyl group, a $C_1$-$C_{10}$ alkenyl group, and preferably H, a $CH_3$ group, Y, X, which may be identical or different, are spacer arms formed of a heteroatom or of a linear or branched hydrocarbon chain comprising at least one carbon atom, and that may contain at least one heteroatom, A, which may be identical or different, forms an anchoring moiety to the substrate, and is chosen from the group comprising thiols, thioethers, thioesters, sulphides, thioamides, silanols, alkoxysilanes, silane halides, hydroxyls, phosphates, protected or non-protected phosphonic acids, protected or non-protected phosphonates, amines, ammoniums, nitrogenated heterocycles, carboxylic acids, anhydrides, catechol, L, which may be identical or different, is a halogenated, preferably fluorinated, $C_1$-$C_{20}$ carbon moiety, $R_4$, which may be identical or different, is H, $CH_3$, a linear or branched, saturated or unsaturated hydrocarbon chain comprising at least 2 carbon atoms, and that may contain at least one heteroatom, with the exception of the copolymer:

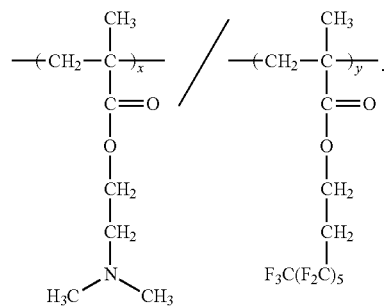

The present invention also concerns the use of a statistical copolymer comprising M units, N units and optionally at least one P unit, linked by covalent bonds by their main chains and randomly distributed, where M is

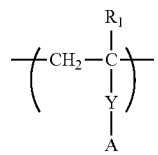

N is

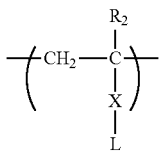

P is

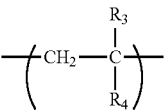

where $R_1$, $R_2$, $R_3$, which may be identical or different, are H, a $C_1$-$C_{10}$ alkyl group, a $C_1$-$C_{10}$ alkenyl group, and preferably H, a $CH_3$ group Y, X, which may be identical or different, are spacer arms formed of a heteroatom or of a linear or branched hydrocarbon chain comprising at least one carbon atom, and that may contain at least one heteroatom A, which may be identical or different, forms an anchoring moiety to the substrate, and is chosen from the group comprising thiols, thioethers, thioesters, sulphides, thioamides, silanols, alkoxysilanes, silane halides, hydroxyls, phosphates, protected or non-protected phosphonic acids, protected or non-protected phosphonates, amines, ammoniums, nitrogenated heterocycles, carboxylic acids, anhydrides, catechol L, which may be identical or different, is a halogenated, preferably fluorinated, $C_1$-$C_{20}$ carbon moiety $R_4$, which may be identical or different, is H, $CH_3$, a linear or branched, saturated or unsaturated hydrocarbon chain comprising at least 2 carbon atoms, and that may contain at least one heteroatom, as epilamization agent for at least one part of a substrate surface, particularly intended for timepieces or for jewellery.

The present invention also concerns a timepiece or piece of jewellery with an element comprising a substrate as defined above.

DETAILED DESCRIPTION OF THE INVENTION

According to the invention, a substrate, particularly a substrate of an element for a timepiece or piece of jewellery, comprises a surface, at least one part of which is coated with an epilamization agent, said epilamization agent comprising at least one compound in the form of a random or statistical copolymer comprising M units, N units and optionally at least one P unit, linked by covalent bonds by their main chains and randomly distributed, where M is

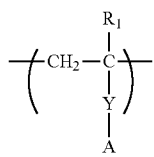

N is

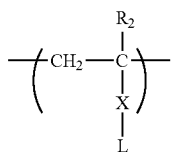

P is

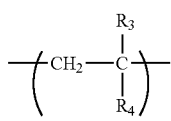

where $R_1$, $R_2$, $R_3$, which may be identical or different, are H, a $C_1$-$C_{10}$ alkyl group, a $C_1$-$C_{10}$ alkenyl group, and preferably H, a $CH_3$ group Y, X, which may be identical or different, are spacer arms formed of a heteroatom or of a linear or branched hydrocarbon chain comprising at least one carbon atom, and that may contain at least one heteroatom A, which may be identical or different, forms an anchoring moiety to the substrate, and is chosen from the group comprising thiols, thioethers, thioesters, sulphides, thioamides, silanols, alkoxysilanes, silane halides, hydroxyls, phosphates, protected or non-protected phosphonic acids, protected or non-protected phosphonates, amines, ammoniums, nitrogenated heterocycles, such as imidazole or pyridine, carboxylic acids, anhydrides, catechol L, which may be identical or different, is a halogenated, preferably fluorinated, $C_1$-$C_{20}$ carbon moiety.

$R_4$, which may be identical or different, is H, $CH_3$, a linear or branched, saturated or unsaturated hydrocarbon chain comprising at least 2 carbon atoms, and that may contain at least one heteroatom.

Preferably, the statistical copolymer comprises M units, N units and optionally at least one P unit, linked by covalent bonds by their main chains and randomly distributed, where M is

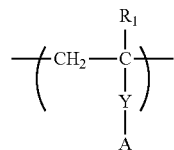

N is

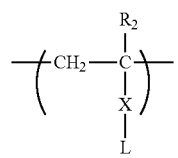

P is

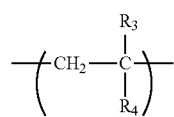

where $R_1$, $R_2$, $R_3$, which may be identical or different, are H, a $C_1$-$C_{10}$ alkyl group, a $C_1$-$C_{10}$ alkenyl group, and preferably H, a $CH_3$ group Y, X, which may be identical or different, are spacer arms formed of a heteroatom or of a linear or branched hydrocarbon chain comprising at least one carbon atom, and that may contain at least one heteroatom A, which may be identical or different, forms an anchoring moiety to the substrate, and is chosen from the group comprising thiols, thioethers, thioesters, sulphides, thioamides, silanols, alkoxysilanes, silane halides, hydroxyls, phosphates, protected or non-protected phosphonic acids, protected or non-protected phosphonates, amines, ammoniums, nitrogenated heterocycles, such as imidazole or pyridine, carboxylic acids, anhydrides, catechol L, which may be identical or different, is a halogenated, preferably fluorinated, $C_1$-$C_{20}$ carbon moiety $R_4$, which may be identical or different, is H, $CH_3$, a linear or branched, saturated or unsaturated hydrocarbon chain comprising at least 2 carbon atoms, and that may contain at least one heteroatom.

Preferably, the statistical copolymer only comprises M, N and optionally P units.

The M, N and P units are statistically linked to each other by their main chain so that the statistical copolymer can be written in the form:

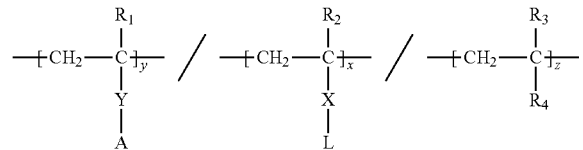

Advantageously, the identical or different Y, X moieties are chosen from the group comprising $C_1$-$C_{20}$ ester groups, preferably $C_2$-$C_{10}$ ester groups, more preferably $C_2$-$C_6$ ester groups, and even more preferably $C_2$-$C_5$ ester groups, preferably alkyl ester groups, preferably linear, amide groups, and styrene derivative groups.

The A functional groups of interest are capable of reaction with the substrate surface to be epilamized, so as to form anchoring moieties for the epilamization agent at the substrate surface. Advantageously, A groups may be provided at the end of the copolymer.

Advantageously, the copolymer comprises at least two different A anchoring moieties.

The L functional groups of interest are responsible for the epilame effect. They comprise at least one halogen atom, preferably a fluorine atom. Preferably, L is a carbon moiety, namely a $C_2$-$C_{20}$, preferably $C_4$-$C_{10}$, and more preferably $C_6$-$C_9$ alkyl chain, which may be cyclic, preferably with no heteroatom. L is partially or completely halogenated. Advantageously, L is an at least partially fluorinated and preferably completely fluorinated moiety. L may also comprise a hydrogen atom in the end group. L is preferably a perfluorinated alkyl chain.

The $R_4$ functional groups of interest of the P units are used to modify the properties of the epilamization agent and/or to provide other functions. For example, $R_4$ may be an alkyl chain, preferably a $C_8$-$C_{20}$ alkyl chain, used to modify the angle of contact obtained or a chain capable of forming cross-linking points in a complementary cross-linking step (step e). For example, the P units may be derived from stearyl methacrylate.

Preferably, the statistical copolymer comprises between 0.1% and 50%, preferably between 5% and 30%, and more preferably between 5% and 20% of M units, between 1% and 99.9%, preferably between 50% and 99.9%, and more preferably between 80% and 95% of N units, and between 0% and 50%, preferably between 0% and 30%, and more preferably between 0% and 10% of P units, the percentages being expressed with respect to the total number of units (x+y+z).

Advantageously, the statistical copolymer comprises between 10 and 350 units (x+y+z).

In a particularly advantageous manner, the M, N, P units are chosen to bear several different types of A groups, several L groups, preferably of the same type, and possibly one or more $R_4$ groups, which may be identical or of a different type, so as to refine and improve the properties of the epilamization agent, in order to obtain more specifically a universal epilamization agent having improved affinity with the substrate.

Preferably, the substrate surface, at least part of which is coated with the epilamization agent, is made of a material chosen from the group comprising metals, doped or undoped metal oxides, polymers, sapphire, ruby, silicon, silicon oxides, silicon nitrides, silicon carbides, DLC (Diamond Like Carbon), and alloys thereof.

More specifically, the substrate surface may be made of steel, of noble metals such as gold, rhodium, palladium, platinum, or of doped or undoped metal oxides of aluminium-, zirconium, titanium, chromium, manganese, magnesium, iron, nickel, copper, zinc, molybdenum, silver, tungsten, or of polyoxymethylene or acrylamide, and alloys thereof.

The invention also concerns a method for epilamization of at least one part of a substrate surface comprising the steps of:
  a) preparing an epilamization agent comprising at least one statistical copolymer as defined above
  b) optionally, preparing the substrate surface, particularly by cleaning in accordance with standard watchmakers' methods
  c) placing the substrate surface in contact with the epilamization agent
  d) drying.

Preferably, the epilamization agent is prepared by the statistical copolymerisation of monomers capable of forming M units with monomers capable of forming N units and optionally with monomers capable of forming at least one P unit.

Statistical copolymerisation techniques are well known to those skilled in the art and do not require detailed description. A particularly suitable polymerisation method is free-radical copolymerisation, in solution or in emulsion.

According to a first variant, statistical copolymerisation can be obtained in a single step by copolymerisation, preferably radical-copolymerisation, of monomers bearing the Y-A side chains with monomers bearing the X-L side chains and possibly with monomers bearing the $R_4$ side chains.

According to another variant, the statistical copolymer may be obtained by copolymerisation, preferably radical polymerisation, of monomers bearing the appropriate Y side chains with monomers bearing the appropriate X side chains and possibly with monomers bearing side chains intended to bear $R_4$, the side chains are then modified, for example by click chemistry, to introduce the A, L functional groups of interest, and the $R_4$ groups.

Preferably, the monomers are chosen from the group comprising acrylate, methacrylate, acrylamide, methacrylamide, vinyl, diene, styrene and olefinic monomers.

Acrylate, methacrylate, acrylamide, methacrylamide, vinyl and styrene monomers are particularly preferred. These products are known and mostly available on the market or can be accessed in a synthesis step.

The particularly preferred monomers are:

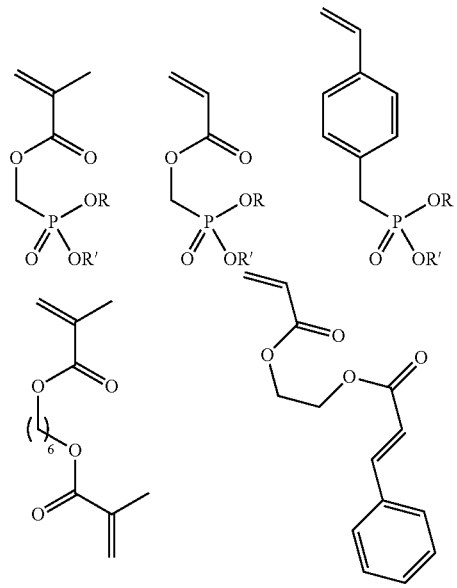

R is equal to or different from R'=H, alkyl, Si(Me)$_3$

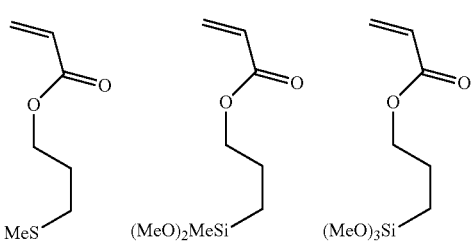

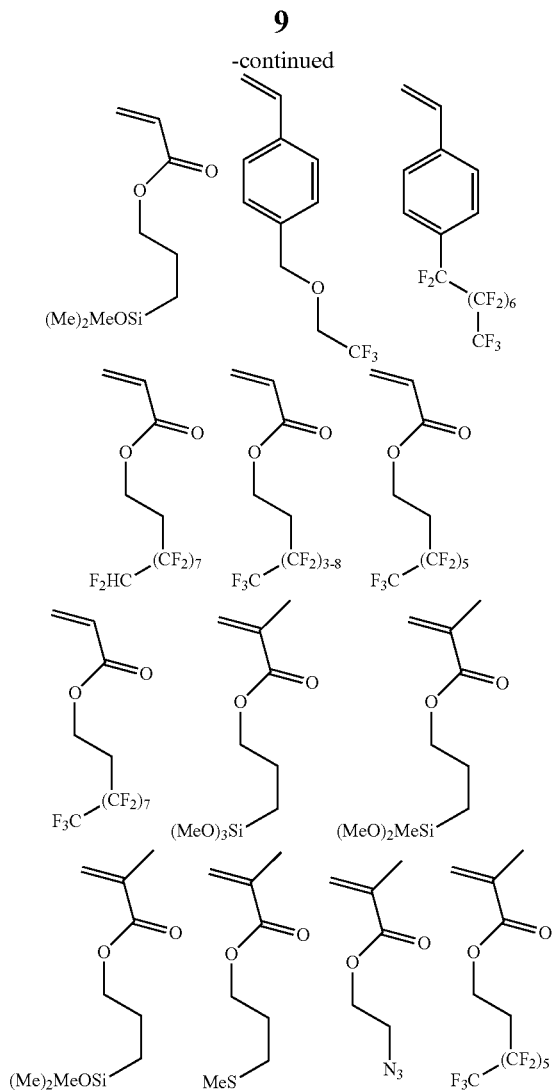
Thus, the copolymer used as the epilamization agent can easily be obtained in a single step or a limited number of steps from commercially available products.
One of the copolymers preferably used in the present invention has the following structure (I):
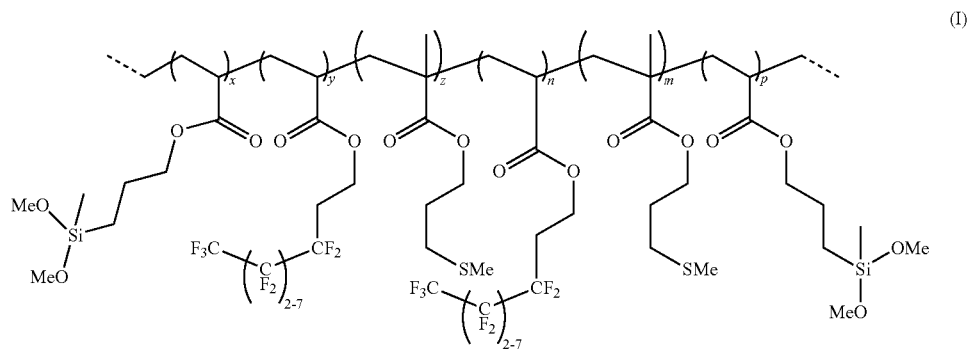
More particularly, a copolymer preferably used in the present invention has the following structure (II):

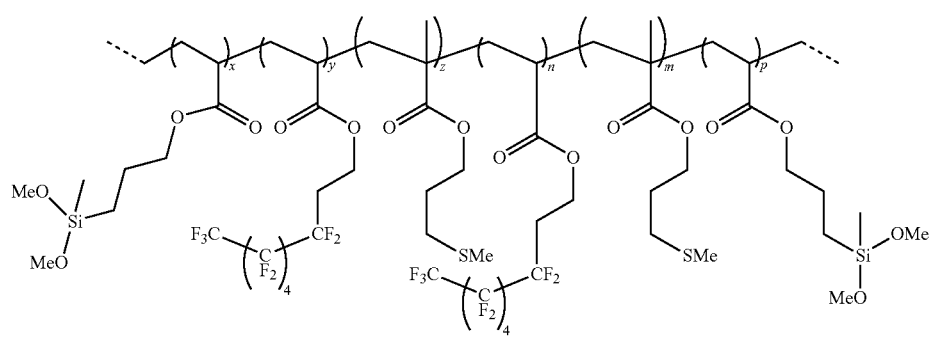

(II)

The copolymers used in the invention can be obtained in powder or viscous liquid form. They can then be placed in solution in a fluorinated solvent, such as perfluorinated or fluorinated hydrocarbons, perfluoropolyethers, hydrofluoroolefins, hydrofluoroethers, in concentrations preferably comprised between 50 mg/L and 250 mg/L, to obtain an epilamization agent solution which will be used to treat the surfaces to be epilamized.

In variants, the epilamization method according to the invention may further comprise, after step c), a complementary cross-linking step e), made possible, in particular, by the presence of the appropriate functional groups of interest provided in the $R_4$ side chains of the P units.

The substrate according to the invention has a surface coated with an epilamization agent that is simple and economical to synthesise, exhibiting affinity with any substrate type and improved resistance to cleaning operations compared to known epilamization agents. An element or a piece with a substrate according to the invention may be used in any type of application in the field of mechanics, and more particularly in precision mechanics, and particularly in horology and jewellery.

The following examples illustrate the present invention without thereby limiting its scope.

Synthesis of 3-Methacryloxypropyl Methyl Thioether (Methylthio)propanol (4.05 mL), dichloromethane (100 mL) and triethylamine (8.2 mL) were added to a three neck flask, with magnetic stirring, placed under nitrogen atmosphere. The solution was cooled in an ice bath and then methacrylate chloride (3.8 mL) was added dropwise over 10 minutes. The reaction mixture was stirred for 2 hours at 0° C. and then at ambient temperature throughout the night. 70 mL of water was added and the reaction mixture was then transferred to a separatory funnel. The organic phase and the aqueous phase were separated. The organic phase was washed with an HCl solution (pH=4) until pH=7 was achieved and then dried over $Na_2SO_4$. The solvent was then removed in a rotary evaporator to yield the expected product with a 97% yield.

RMN$^1$H (CDCl$_3$, 500 MHz): chemical shift (ppm): 6.10 (s, 1H), 5.56 (s, 1H), 4.24 (t, 2H), 2.58 (t, 2H), 2.11 (s, 3H), 1.99 (m, 2H), 1.94 (s, 3H)

Example 1

An epilamization agent in the form of a statistical copolymer was synthesised by the free-radical polymerisation of:
- (3-acryloxypropyl)methyldimethoxysilane
- 1H,1H,2H,2H-Perfluorodecylacrylate
- 3-methacryloxypropyl methyl thioether (prepared as set out above) according to the following procedure:

(3-acryloxypropyl)methyldimethoxysilane (189 μL) and 3-methacryloxypropyl methyl thioether (159 μL) and then 1H,1H,2H,2H-Perfluorodecylacrylate (2.3 mL) were added to a Schlenk tube containing cyclohexanone (2.5 mL) previously degassed with nitrogen. The reaction medium was bubbled with nitrogen for 5 minutes, then 0.8 mL of Novec™ hydrofluoroether HFE-7200 (3M™) previously bubbled with nitrogen was added. 0.5 mL of a 0.228 mol/L solution of azobisisobutyronitrile (AIBN) was added. The reaction medium was stirred and heated to 80° C. for 3 hours. The polymer was coagulated in methanol and then rinsed (3×50 mL). The polymer was obtained in the form of a white powder (yield=90%).

The following statistical copolymer is obtained:

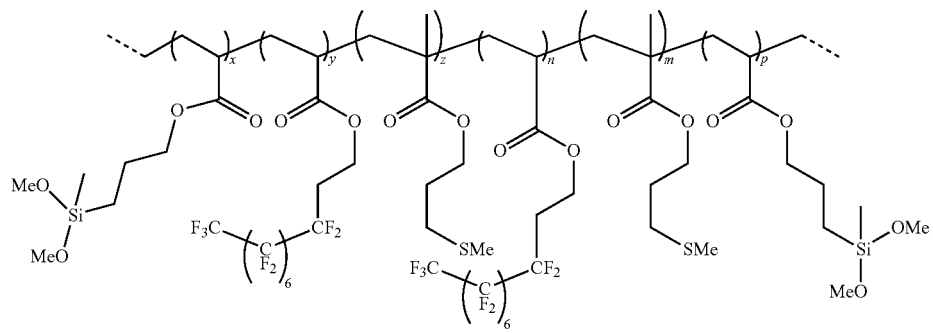

Example 2

An epilamization agent in the form of a statistical copolymer is synthesised by the controlled free-radical polymerisation of:

(3-acryloxypropyl)methyldimethoxysilane
1H,1H,2H,2H-Perfluorodecylacrylate
3-methacryloxypropyl methyl thioether
1,6-Hexanediol dimethacrylate according to the following procedure:

(3-acryloxypropyl)methyldimethoxysilane (189 μL) and 3-methacryloxypropyl methyl thioether (159 μL) 1,6-Hexanediol dimethacrylate (12 μL) and then 1H,1H,2H,2H-Perfluorodecylacrylate (2.3 mL) were added to a Schlenk tube containing cyclohexanone (2.5 mL) previously degassed with nitrogen. The reaction medium was bubbled with nitrogen for 5 minutes, then 0.8 mL of Novec™ HFE-7200, previously bubbled with nitrogen, was added. 0.5 mL of a 0.228 mol/L solution of AIBN was added. The reaction medium was stirred and heated to 80° C. for 3 hours. The polymer was coagulated in methanol and then rinsed (3×50 mL). The polymer was obtained in the form of a white powder (yield=97%).

The following statistical crosslinked copolymer is obtained:

3-methacryloxypropyl methyl thioether
2-Cinnamoyloxyethyl acrylate (post cross-linkable monomer) according to the following procedure:

(3-acryloxypropyl)methyldimethoxysilane (189 μL) and 3-methacryloxypropyl methyl thioether (159 μL), 2-cinnamoyloxyethyl acrylate (92 mg) and then 1H,1H,2H,2H-Perfluorodecylacrylate (2.2 mL) were added to a Schlenk tube containing cyclohexanone (2.5 mL) previously degassed with nitrogen. The reaction medium was bubbled with nitrogen for 5 minutes, then 0.8 mL of Novec™ HFE-7200, previously bubbled with nitrogen, was added. 0.5 mL of a 0.228 mol/L solution of AIBN was added. The reaction medium was stirred and heated to 80° C. for 3 hours. The polymer was coagulated in methanol and then washed (3×50 mL). The polymer is obtained in the form of a white powder (yield=90%).

The following post-crosslinkable statistical copolymer is obtained:

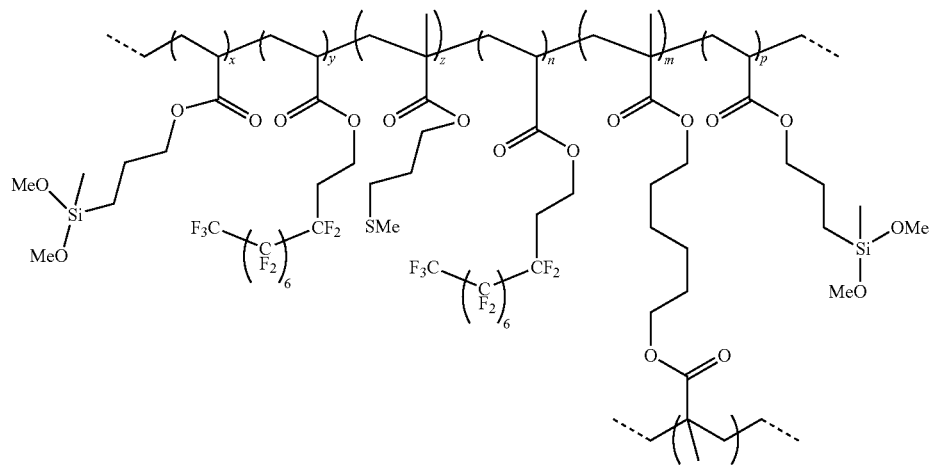

In this copolymer, the $R_4$ side chain of the P units is crosslinked with the side chain of another copolymer.

Example 3

An epilamization agent in the form of a post crosslinkable statistical copolymer is synthesised by the free-radical polymerisation of:
(3-acryloxypropyl)methyldimethoxysilane
1H,1H,2H,2H-Perfluorodecylacrylate

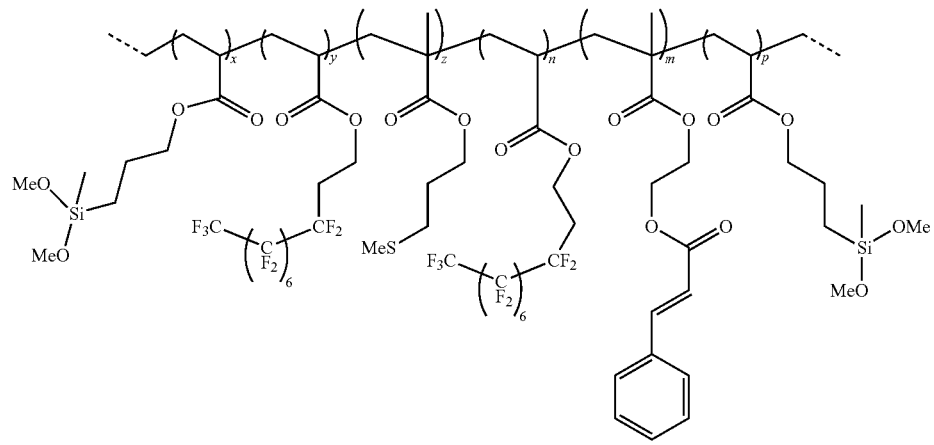

In this copolymer, the $R_4$ side chain may be UV-cross-linked just after the synthesis or after deposition on the substrate.

Example 4

An epilamization agent in the form of a statistical copolymer is synthesised by the free-radical polymerisation of:
3-acryloxypropyl methyltrimethoxysilane
1H, 1H,2H,2H-Perfluorodecylacrylate
(dimethoxyphosphoryl)methyl 2-methylacrylate
2-thioethyl methacrylamide (synthesised in accordance with the procedure described in the publication: Synthesis and characterization of a high selective mercury (II)-imprinted polymer using novel aminothiol monomer, Talanta, 101, 261-266; 2012) according to the following procedure:

3-acryloxypropyl methyltrimethoxysilane (378 μL) and 2-thioethyl methacrylamide (132 μL) and then 1H,1H,2H,2H-Perfluorodecylacrylate (2.3 mL) were added to a Schlenk tube containing cyclohexanone (2.5 mL) previously degassed with nitrogen. The reaction medium was bubbled with nitrogen for 5 minutes, then 0.8 mL of Novec™ HFE-7200, previously bubbled with nitrogen, was added. 0.5 mL of a 0.228 mol/L solution of azobisisobutyronitrile (AIBN) was added. The reaction medium was stirred and heated to 80° C. for 3 hours. The polymer was coagulated in methanol and then rinsed (3×50 mL). The polymer was obtained in the form of a white powder (yield=90%).

The following statistical copolymer is obtained:

(3-acryloxypropyl)methyldimethoxysilane 1H, 1H,2H,2H-Perfluorooctylacrylate 3-acryloxypropyl methyl thioether (obtained using the procedure described in the literature: Preparation of biomimetic polymer hydrogel materials for contact lenses, Bertozzi, Carolyn et al. U.S. Pat. No. 6,552,103) according to the following procedure:

3-acryloxypropyl methyldimethoxysilane (148 μL) and 3-acryloxypropyl methyl thioether (108 μL) and then 1H,1H,2H,2H-Perfluorooctylacrylate (2.1 mL) were added to a Schlenk tube containing cyclohexanone (2 mL) previously degassed with nitrogen. The reaction medium was bubbled with nitrogen for 5 minutes, then 0.8 mL of hydrofluoroether (Novec™ HFE-7200), previously bubbled with nitrogen, was added. 0.5 mL of a 0.228 mol/L solution of azobisisobutyronitrile (AIBN) was added. The reaction medium was stirred and heated to 80° C. for 3 hours. The polymer was coagulated in methanol and then rinsed (3×50 mL). The polymer was obtained in the form of a translucent gel (yield=90%).

The following statistical copolymer is obtained:

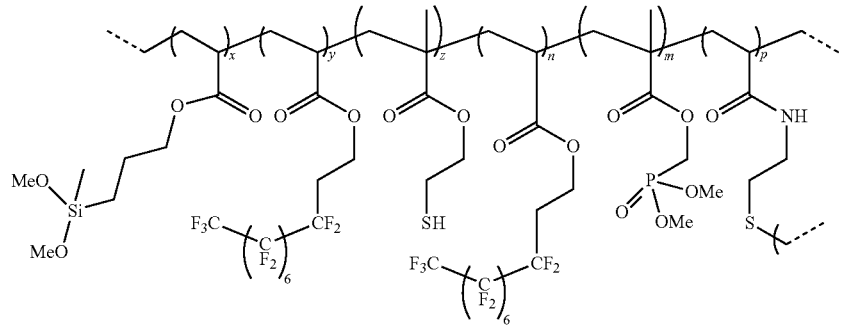

Example 5

An epilamization agent in the form of a statistical copolymer is synthesised by the free-radical polymerisation of:

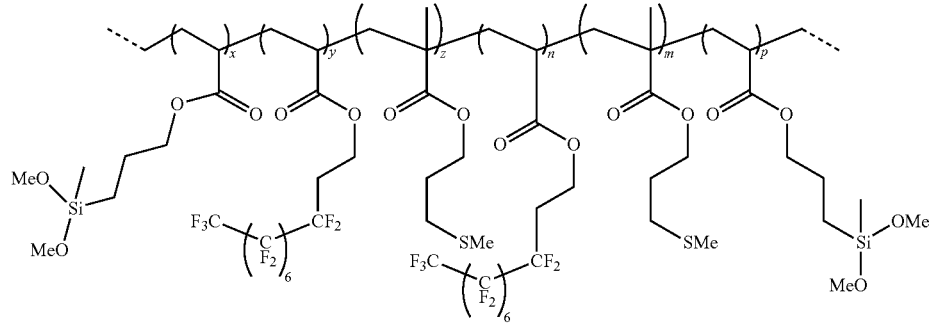

Example 6

Resistance to Cleaning

Procedures Used:

Preparation of Substrates

Prior to the epilame treatment, different types of substrates were cleaned using standard watchmakers' methods. More specifically, the parts were cleaned with a Rubisol solution in the presence of ultrasound, rinsed three times with isopropyl alcohol, and then dried with hot air.

Epilame Treatment of Substrates

The substrates were epilamized by immersion (around 5 minutes) in a solution of the epilamization agent: (solvent: 250 mg/L DuPont™ Vertrel® Suprion™) and then dried with hot air.

Resistance to Cleaning

The resistance to cleaning of the epilamization agents was evaluated after 3 successive cleaning operations (standard watchmakers' cleaning with a Rubisol solution) of the epilamized parts.

Angles of Contact

The effectiveness of the epilamization agent was evaluated by depositing drops of 2 lubricants: MOEBIUS Testöl 3 and 9010 oil. For each lubricant and each epilamization agent, the angles of contact between the substrates and the lubricants were measured with an OCA Dataphysics instrument.

Results:

The various substrates were epilamized either with the epilamization agent of example 1, or with the epilamization agent of example 4. Then the substrates were cleaned by three watchmakers' cleaning operations.

For comparison, different substrates are epilamized:
- either with Moebius® Fixodrop® FK/BS (one of the most used epilames on the market)
- or with the epilamization agent M51 mentioned below, described in WO Patent 2014/009058 followed by 3 watchmakers' cleaning operations.

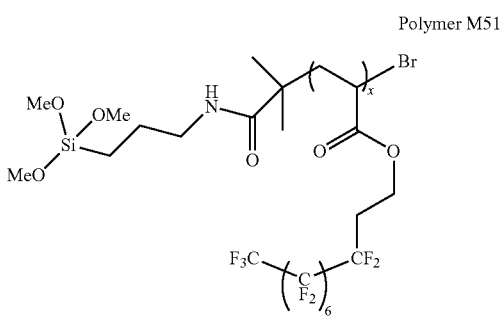

Polymer M51

M51 epilamization agent is known to be one of the most resistant epilamization agents to watchmakers cleaning operations.

Drops of Testöl 3 oil and 9010 oil were respectively deposited on each epilamized substrate and the angles of contact between the substrates and the lubricants were measured.

The results are set out in the tables below which show the values of the measured angles of contact:

TABLE 1

Angles of contact measured with MOEBIUS 9010 oil

| Epilamization agent | Substrate | | | | | |
|---|---|---|---|---|---|---|
| | Sapphire | Steel | Nickel | Rhodium | Gold | polyoxymethylene (Hostaform ® from Celanese) |
| Example 1 (inv.) | 77 | 82 | 67 | 75 | 78 | 62 |
| Example 4 (inv.) | 74 | 75 | 69 | 60 | 72 | — |
| M51 (comp.) | 75 | 44 | 46 | 41 | 59 | — |
| Fixodrop ® (comp.) | 45 | 50 | 41 | 36 | 40 | 35 |

TABLE 2

Angles of contact measured with MOEBIUS Testol 3 oil

| Epilamization agent | Substrate | | | | | |
|---|---|---|---|---|---|---|
| | Sapphire | Steel | Nickel | Rhodium | Gold | Hostaform ® POM |
| Example 1 (inv.) | 62 | 59 | 54 | 53 | 63 | 47 |
| Example 4 (inv.) | 56 | 58 | 53 | 45 | 55 | — |
| M51 (comp.) | 60 | 34 | 37 | 36 | 47 | — |
| Fixodrop ® (comp.) | 34 | 32 | 29 | 24 | 33 | 30 |

CONCLUSION

The above results show that the angles of contact obtained after three watchmakers' cleaning operations with the two oils (Testöl 3 and 9010) are much greater for the epilamized substrates of the invention compared to the substrate epilamized with a known epilamization agent. The epilamization effect after three watchmakers' cleaning operations is thus much greater with the substrates epilamized according to the present invention. This demonstrates that substrates epilamized in accordance with the invention offer improved resistance to cleaning, whatever their type.

What is claimed is:

1. A substrate comprising a surface at least one part of which is coated with an epilamization agent, wherein said epilamization agent comprises at least one compound in the form of a statistical copolymer consisting of M units, N units and optionally at least one P unit, linked by covalent bonds by their main chains and randomly distributed, where M is

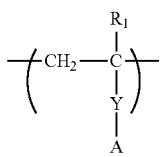

N is

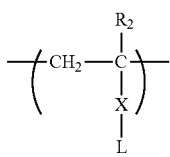

P is

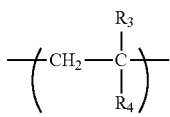

where $R_1$, $R_2$, $R_3$, which may be identical or different, are H, a $C_1$-$C_{10}$ alkyl group, a $C_1$-$C_{10}$ alkenyl group, Y, X, which may be identical or different, are spacer arms formed of a heteroatom or of a linear or branched hydrocarbon chain comprising at least one carbon atom, and that may contain at least one heteroatom, A, which may be identical or different, forms an anchoring moiety to the substrate, and is chosen from the group comprising thiols, thioethers, thioesters, sulphides, thioamides, silanols, silane halides, hydroxyls, phosphates, protected or non-protected phosphonic acids, protected or non-protected phosphonates, amines, ammoniums, nitrogenated heterocycles, carboxylic acids, anhydrides, catechol, L, which may be identical or different, is a halogenated $C_1$-$C_{20}$ carbon moiety, $R_4$, which may be identical or different, is H, $CH_3$, a linear or branched, saturated or unsaturated hydrocarbon chain comprising at least 2 carbon atoms, and that may contain at least one heteroatom.

2. The substrate according to claim 1, wherein $R_1$, $R_2$, $R_3$, which may be identical or different, are H or a $CH_3$ group.

3. The substrate according to claim 1, wherein Y, X, which may be identical or different, are selected from the group comprising $C_1$-$C_{20}$ ester groups, amide groups, and styrene derivative groups.

4. The substrate according to claim 3, wherein Y, X, which may be identical or different, are $C_2$-$C_{10}$ ester groups.

5. The substrate according to claim 1, wherein the copolymer comprises at least two different A anchoring moieties.

6. The substrate according to claim 1, wherein L is a $C_2$-$C_{20}$ carbon moiety.

7. The substrate according to claim 6, wherein L is a $C_4$-$C_{10}$ carbon moiety.

8. The substrate according to claim 1, wherein L is an at least partially fluorinated moiety.

9. The substrate according to claim 8, wherein L is a completely fluorinated moiety.

10. The substrate according to claim 1, wherein the statistical copolymer comprises between 0.1% and 50% of M units, between 1% and 99.9% of N units, and between 0% and 50% of P units.

11. The substrate according to claim 10, wherein the copolymer comprises between 5% and 30% of M units, between 50% and 99.9% of N units, and between 0% and 30% of P units.

12. The substrate according to claim 1, wherein the statistical copolymer comprises between 10 and 350 units.

13. The substrate according to claim 1, wherein the surface thereof, at least part of which is coated with the epilamization agent, is made of a material chosen from the group comprising metals, metal oxides, polymers, sapphire, ruby, silicon, silicon oxides, silicon nitrides, silicon carbides, DLC, and alloys thereof.

14. A timepiece or piece of jewellery comprising an element comprising a substrate according to claim 1.

* * * * *